United States Patent
Manojlovic

(10) Patent No.: US 6,238,006 B1
(45) Date of Patent: May 29, 2001

(54) VEHICLE WHEEL HAVING A BALANCE WEIGHT RETENTION SHOULDER

(75) Inventor: Denny Manojlovic, Wixon, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/439,518

(22) Filed: Nov. 12, 1999

Related U.S. Application Data

(60) Provisional application No. 60/108,040, filed on Nov. 12, 1998.

(51) Int. Cl.$^7$ .............................. B60B 1/00; B60B 27/00
(52) U.S. Cl. ........................................ 301/5.21; 301/5.22
(58) Field of Search ................ 301/5.21 I, 5.22

(56) References Cited

U.S. PATENT DOCUMENTS

| | | | |
|---|---|---|---|
| 2,202,129 | * 5/1940 | Turner | 301/5.21 |
| 3,890,008 | * 6/1975 | Lejeune | 301/5.21 |
| 4,720,149 | 1/1988 | Thissen et al. . | |
| 4,728,154 | 3/1988 | Boyle et al. . | |
| 5,228,754 | 7/1993 | Rogers . | |
| 5,350,220 | * 9/1994 | Atwell, Jr. | 301/5.21 |
| 5,564,791 | 10/1996 | Chase et al. . | |
| 5,733,016 | 3/1998 | Brown . | |

FOREIGN PATENT DOCUMENTS

| | | | |
|---|---|---|---|
| B28660 | * 6/1956 | (DE) | 301/5.21 |
| 954483 | * 12/1956 | (DE) | 301/5.21 |

* cited by examiner

Primary Examiner—S. Joseph Morano
Assistant Examiner—Jason R. Bellinger
(74) Attorney, Agent, or Firm—MacMillan, Sobanski & Todd, LLC

(57) ABSTRACT

A circumferential retention shoulder formed in a surface of a vehicle wheel rim cooperates with a wheel balance weight barb to retain the wheel balance weight upon the vehicle wheel.

11 Claims, 4 Drawing Sheets

US 6,238,006 B1

VEHICLE WHEEL HAVING A BALANCE WEIGHT RETENTION SHOULDER

CROSS REFERENCE TO RELATED APPLICATIONS

This application claims the benefit of U.S. Provisional application No. 60/108,040, filed on Nov. 12, 1998.

BACKGROUND OF THE INVENTION

This invention relates in general to vehicle wheels and in particular to a circumferential retention shoulder formed in a surface of a vehicle wheel rim that cooperates with a wheel balance weight barb to retain the wheel balance weight upon the vehicle wheel.

It is necessary to install balance weights on the rims of vehicle wheels to achieve proper balance of the combined mass of the wheel and the tire mounted upon the wheel. Proper balance of a wheel and tire is desirable to prevent vibrations which may otherwise occur at certain wheel speeds. Referring now to the drawings, a typical prior art wheel balance weight is generally shown at 10 in FIG. 1. The wheel balance weight 10 includes an arcuate shaped lead weight 12 that is cast over a spring steel clip 14. The upper portion of the clip 14 has an opening 16 formed therethrough. A barb 18 formed in the clip 14 extends into the opening 16.

The wheel balance weight 10 is attached to an outward axially extending lip 20 formed on the outboard side of a wheel rim tire bead retaining flange 22, as illustrated in FIG. 2. The location of the weight 10 upon the flange lip 20 is determined during a conventional wheel balancing process. The clip 14 is crimped or hammered into place upon the flange lip 20 once the proper position is determined. Additionally, the barb 18 is crimped or hammered into the surface of the flange lip 20 to further secure the wheel balance weight 10 to the wheel rim.

It is known to extend the outboard portion of the wheel rim flange lip 20 to create a larger gripping surface for the clip 14 and to confine the lead weight 12 at the outer perimeter of the lip 20. This allows the lead weight 12 to be positioned against the flange 22 and completely under the flange lip 20, as illustrated in FIG. 2.

It also is know in the art, as shown in U.S. Pat. No. 5,733,016, to form a circumferential retention groove 24 in the radial outer portion of the wheel rim flange lip 20, as shown in FIG. 3. An alternate embodiment 23 of the wheel balance weight is used with the retention groove 24. Instead of having a barb 18, as described above, the wheel balance weight 23 includes a spring clip 14 having an upper end 26 that is folded over to form a bead 28. The bead 28 has a shape that corresponds to the shape of the retention groove 24. The wheel balance weight 23 is attached by snapping the spring clip bead 28 into the retention groove 24. The clip 14 does not actually contact the outboard surface of the flange lip 20. Accordingly, the wheel surface is not marred by attachment and removal of the wheel balance weight 23.

SUMMARY OF THE INVENTION

This invention relates to a circumferential retention shoulder formed in a surface of a vehicle wheel rim that cooperates with a wheel balance weight barb to retain the wheel balance weight upon the vehicle wheel.

Know wheel weights are crimped onto the outboard end of wheel rims. The crimped portion is unsightly. Accordingly, it would be desirable to provide a structure for attaching wheel weights to vehicle wheels with the attaching mechanism hidden from view. Additionally, it is possible to form a retention groove in the wheel rim to enhance the retention of wheel balance weights; however, such a retention groove requires a different structure for the wheel balance weight retaining clip. Accordingly it is necessary for tire stores to carry an inventory of different types of wheel balance weights. Therefore, it would also be desirable to utilize one type of wheel balance weight.

The present invention contemplates a vehicle wheel including an annular wheel rim having an outboard time bead retaining flange. A circumferential retention shoulder is formed in an inboard surface of the tire bead retaining flange. A circular wheel disc is formed across the outboard end of the wheel rim. The wheel disc is adapted to be attached to a vehicle.

It is further contemplated that the inventions includes a wheel balance weight mounted upon the wheel rim. The balance weight includes a retaining clip that extends over the tire bead retaining flange. The clip includes a member extending therefrom and against the retention shoulder. The member cooperates with the retention shoulder to secure the wheel balance weight to the wheel rim.

In the preferred embodiment, the retention shoulder includes an arcuate shaped surface. Additionally, the outboard tire bead retaining flange includes an inboard surface that is connected to the retention shoulder by a transition surface, the transition surface cooperating with the retention shoulder to define a retention recess. The retention recess receives the end of the wheel balance weight retention clip. In the preferred embodiment, the transition surface has an arcuate shape. Furthermore, the transition surface can include a cylindrical portion between the retention shoulder and the arcuate shaped portion thereof.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
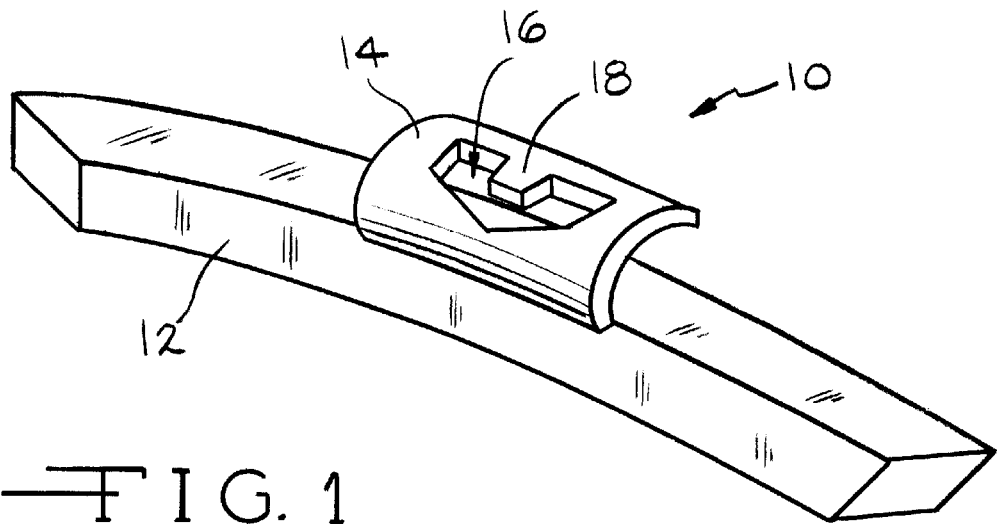
FIG. 1 is a perspective view of a prior art wheel balance weight.
Figure 2:
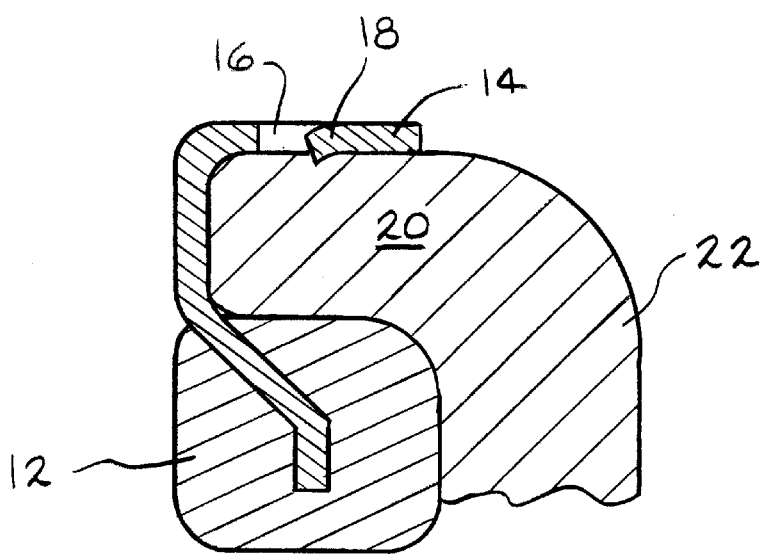
FIG. 2 is a sectional view of the balance weight shown in FIG. 1 mounted upon a wheel rim.
Figure 3:
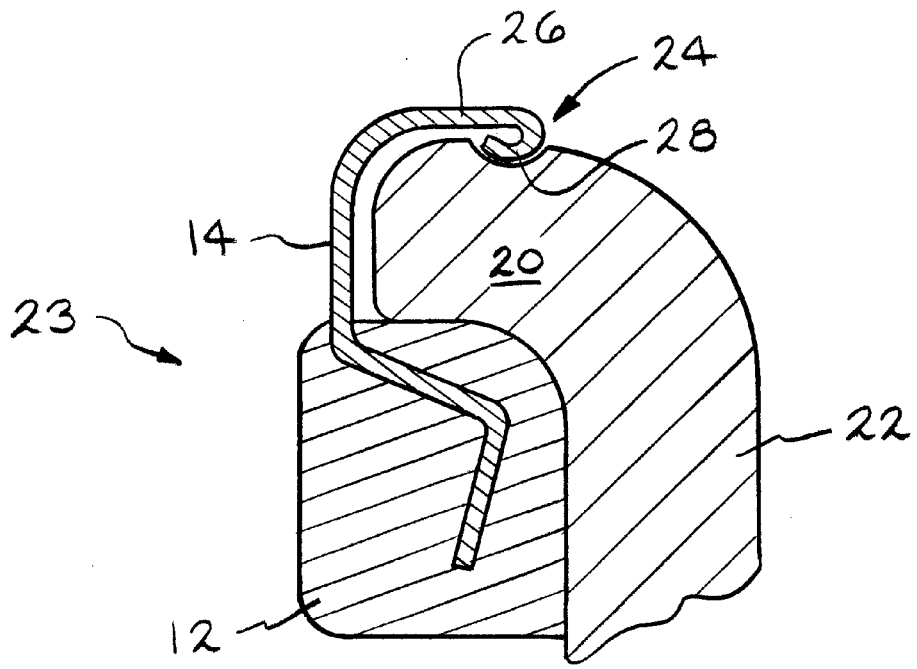
FIG. 3 is a sectional view of an alternate embodiment of the balance weight shown in FIG. 1 mounted upon a wheel rim.
Figure 4A:
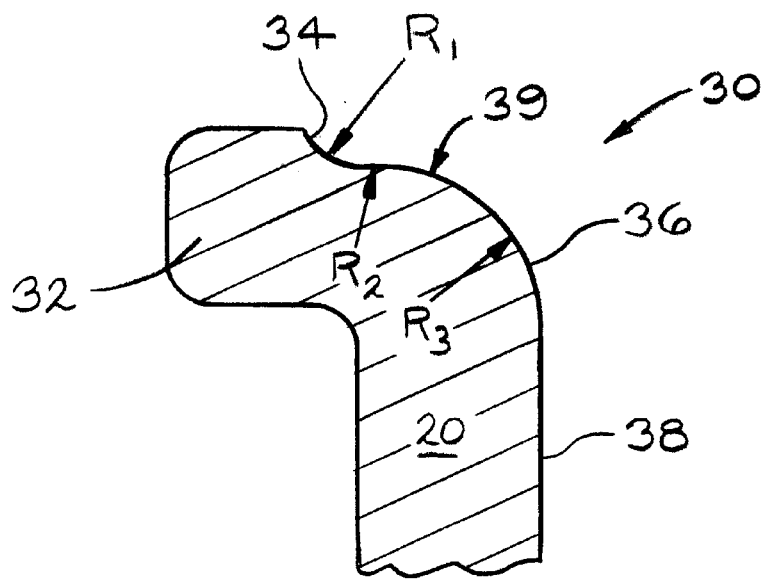
FIG. 4A is an enlarged sectional view of a portion of FIG. 4 that shows a weight retention shoulder.
Figure 4:
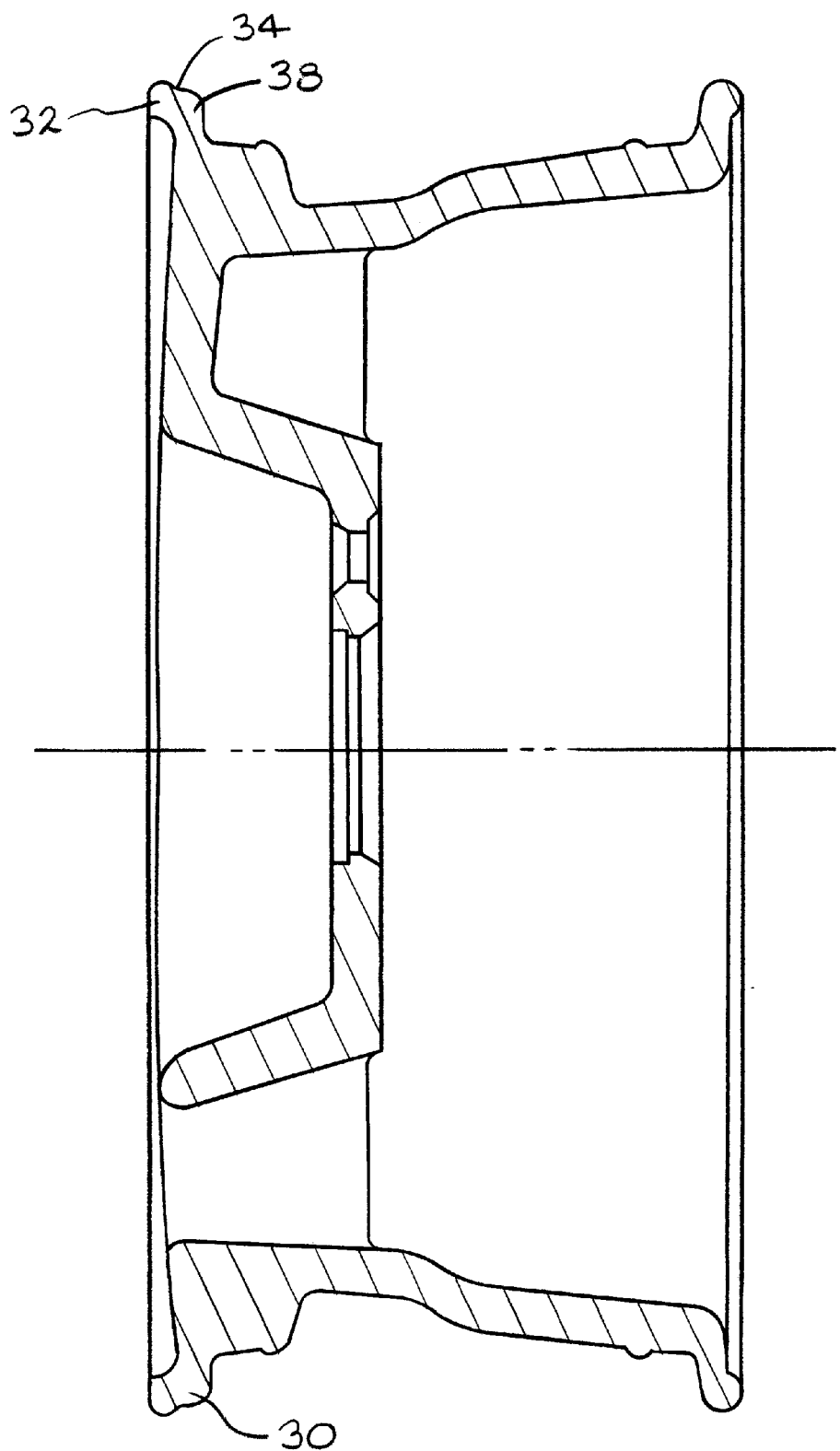
FIG. 4 is sectional view of a wheel that includes a weight retention shoulder formed in a wheel rim flange in accordance with the invention.

Referring again to the drawings, there is illustrated, in FIG. 4, a portion of the outboard end of an annular vehicle wheel rim 30. Components which are similar to components shown in the previous figures have the same numerical designators. A circular wheel disc (not shown) extends across the outboard end or the wheel rim and has a plurality of holes formed therethrough for securing the wheel to a vehicle wheel hub. A pneumatic tire (not shown) can be mounted upon the wheel rim 30. A radially extending outboard tire bead retaining flange 20 is formed upon the outboard end of the wheel rim 30. The flange ends in a lip 32 that extends in an outward axial direction from the wheel rim 30.

As best seen in FIG. 4, circumferential retention shoulder 34 is formed in the inboard surface of the tire bead retaining flange 20. In the preferred embodiment, the shoulder 34 has a circular shape with having a radius $R_1$. In the preferred embodiment, the radius $R_1$ is 3.0 mm. However, the invention also can be practiced with retention shoulders having other radii and shapes, such as, for example, parabolic or elliptical. The retention shoulder 34 is formed by a conventional process, such as machining the shoulder 34 into the wheel flange surface. Alternately, the retention shoulder 34 can be cast into the wheel flange.

The retention shoulder 34 is connected by an transition surface 36 having a compound curvature to the inboard surface 38 of the wheel flange 20. The compound curvature of the transition surface 36 is illustrated as having two radii, $R_2$ and $R_3$, with $R_3$ being greater than $R_2$. In the preferred embodiment, $R_2$ is 2.0 mm while $R_3$ is 9.0 mm. It will be appreciated, however, that the invention also can be practiced having other radii and/or shapes for the transition surface 36. The retention shoulder 34 and the transition surface cooperate to form a recess 39 in the inboard portion of the radial outer edge of the wheel rim flange 20. In the preferred embodiment, the recess 39 has a depth of 1.0 mm; however, the invention also can be practiced with a recess 39 having a different depth. The purpose for the recess 39 will be explained below.

Figure 5:
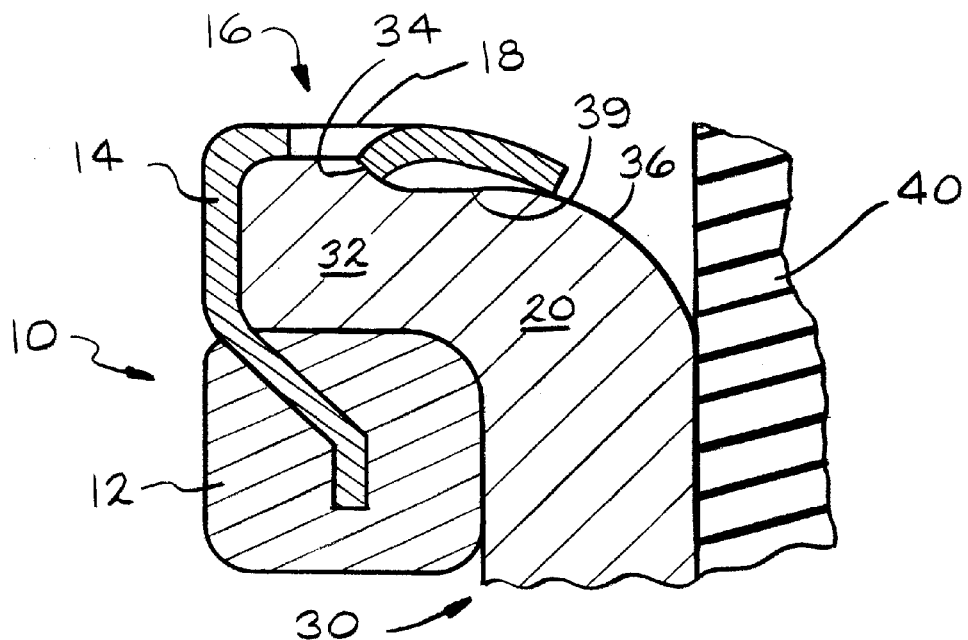
FIG. 5 is a sectional view of the balance weight shown in FIG. 1 mounted upon the wheel rim shown in FIG. 4.

In FIG. 5, a conventional wheel balance weight 10 is attached to the wheel rim 30. The balance weight clip 14 extends over the flange end portion 32 and is crimped or otherwise urged into the recess 39 on the inboard side of the wheel rim flange 20 to retain the wheel balance weight 10 upon the wheel rim 30. The barb 18 of the wheel balance weight 10 frictionally engages, or "digs", into the retention shoulder 34 to prevent the wheel balance weight 10 from sliding out of position. Additionally, the barb portion of the clip 14 is generally "hidden" from view on the inside surface of the wheel rim flange 20. As illustrated in FIG. 5, the axial width of the flange lip 32 is sufficient that the wheel balance weight clip 14 does not interfere with a tire bead 40 when a tire is mounted upon the wheel rim 30. Accordingly, the present invention contemplates utilizing conventional wheel balancing weights.

Figure 6:
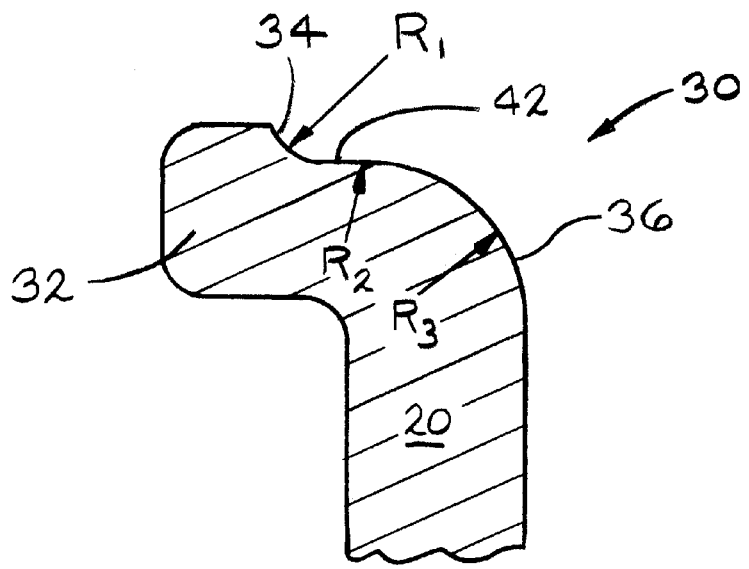
FIG. 6 is a sectional view of an alternate embodiment of the weight retention shoulder shown in FIG. 4.

An alternate embodiment of the invention is illustrated in FIG. 6 where the transition surface 36 includes a cylindrical portion 42 between the retention shoulder 34 and the compound curved surface 36. The embodiment shown in FIG. 6 is applicable when the wheel has a greater tire bead retaining flange width.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, different radii can be used to form the retention shoulder and transition surface. Additionally, it is contemplated that the transition surface can have other shapes than a compound curve.

What is claimed is:

1. A vehicle wheel comprising:
   an annular wheel rim having an outboard tire bead retaining flange, said flange having a lip extending axially from an outboard edge thereof, said lip having an annular portion that extends in an outward radial direction to form a circumferential balance weight retention shoulder upon an inboard surface of said tire bead retaining flange; and
   a circular wheel disc formed across said wheel rim, said wheel disc adapted to be attached to a vehicle.

2. A balanced vehicle wheel comprising:
   an annular wheel rim having an outboard tire bead retaining flange, said flange having a lip extending axially from an outboard edge thereof, said lip having an annular portion that extends in an outward radial direction to form a circumferential balance weight retention shoulder upon an inboard surface of said tire bead retaining flange;
   a circular wheel disc formed across said wheel rim, said wheel disc adapted to be attached to a vehicle; and
   a wheel balance weight, said balance weight including a retaining clip which extends over the tire bead retaining flange, said clip including a member extending therefrom and against said retention shoulder, said member cooperating with said retention shoulder to secure said wheel balance weight to said wheel rim whereby said wheel is balanced.

3. A vehicle wheel according to claim 2 wherein said clip member includes a barb, said barb cooperating with said balance weight retention shoulder to retain said wheel balance weight upon the wheel.

4. A vehicle wheel according to claim 3 wherein said retention shoulder includes an arcuate shaped surface.

5. A vehicle wheel according to claim 4 wherein said outboard tire bead retaining flange includes an inboard surface, said inboard flange surface being connected to said retention shoulder by a transition surface, and further wherein said transition surface cooperates with said retention shoulder to define a retention recess in said lip.

6. A vehicle wheel according to claim 5 wherein said transition surface has an arcuate shape.

7. A vehicle wheel according to claim 6 wherein said retention shoulder has an arcuate shape.

8. A vehicle wheel according to claim 7 wherein said retention shoulder has a generally concave shape with a radius of 3.0 mm.

9. A vehicle wheel comprising:
   an annular wheel rim having an outboard tire bead retaining flange, said outboard tire bead retaining flange including an axially outward extending lip formed upon the circumference thereof, said outboard tire bead retaining flange including an inboard surface, said inboard flange surface being connected to said retention shoulder by a transition surface, said transition surface cooperating with said retention shoulder to define a retention recess in said lip, both of said retention and transition surfaces having an arcuate shape with said transition surface forming a compound curve including at least two radii with said radii increasing in magnitude from said retention shoulder to said wheel rim inboard surface; and
   a circular wheel disc formed across said wheel rim, said wheel disc adapted to be attached to a vehicle.

10. A vehicle wheel according to claim 9 wherein said compound curve includes a first radius of 2.0 mm and a second radius of 9.0 mm.

11. A vehicle wheel according to claim 7 further including an annular portion between said retention shoulder and said transition surface.

* * * * *